United States Patent
Lee et al.

(10) Patent No.: US 11,175,778 B2
(45) Date of Patent: Nov. 16, 2021

(54) TOUCH DISPLAY DEVICE AND DISPLAY PANEL

(71) Applicant: LG Display Co., Ltd., Seoul (KR)

(72) Inventors: Haewon Lee, Seoul (KR); JuHan Kim, Paju-si (KR); Jinseong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/018,620

(22) Filed: Sep. 11, 2020

(65) Prior Publication Data
US 2021/0132733 A1    May 6, 2021

(30) Foreign Application Priority Data
Oct. 30, 2019  (KR) .......................... 10-2019-0136521

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04107* (2013.01)

(58) Field of Classification Search
CPC ...... G06F 3/0412; G06F 3/0418; G06F 3/044; G06F 2203/04107
See application file for complete search history.

(56) References Cited

U.S. PATENT DOCUMENTS

| | | | |
|---|---|---|---|
| 2013/0342770 A1* | 12/2013 | Kim | G06F 3/0443 349/12 |
| 2014/0184942 A1* | 7/2014 | Bang | G02F 1/133512 349/12 |
| 2016/0019854 A1* | 1/2016 | Liu | G09G 3/3614 345/204 |
| 2016/0188063 A1* | 6/2016 | Kim | G06F 3/0412 345/173 |
| 2017/0108976 A1* | 4/2017 | Ding | G06F 3/044 |
| 2017/0115775 A1* | 4/2017 | Wu | H01L 29/78633 |
| 2017/0192573 A1* | 7/2017 | Kim | G06F 3/0446 |
| 2017/0212621 A1 | 7/2017 | Bai et al. | |
| 2019/0043895 A1* | 2/2019 | Shen | H01L 27/124 |
| 2019/0079623 A1 | 3/2019 | Kim et al. | |
| 2019/0278455 A1* | 9/2019 | Li | H01L 27/32 |

FOREIGN PATENT DOCUMENTS

EP     2706442 A1     3/2014

OTHER PUBLICATIONS

Extended European Search Report, European Patent Application No. 20203994.7, dated Mar. 16, 2021, ten pages.

* cited by examiner

*Primary Examiner* — Hong Zhou
(74) *Attorney, Agent, or Firm* — Fenwick & West LLP

(57) ABSTRACT

The present disclosure relates to touch display device and display panel. Provided are a touch display device and a display panel able to improve touch sensing performance by reducing crosstalk occurring between data lines and touch lines. A shield pattern is disposed in an area in which the touch lines overlap the data lines. A shield signal is applied to the shield pattern through shield lines in an area in which the shield pattern does not overlap the touch lines or the data lines. Direct capacitance is not formed between the touch lines and the data lines.

17 Claims, 10 Drawing Sheets

TOUCH DISPLAY DEVICE AND DISPLAY PANEL

CROSS REFERENCE TO RELATED APPLICATION

This application claims priority from Republic of Korea Patent Application No. 10-2019-0136521, filed on Oct. 30, 2019, which is hereby incorporated by reference in its entirety.

BACKGROUND

Field

The embodiments herein relate to a touch display device and a display panel.

Background Art

Along with the development of the information society, demand for various types of display devices for displaying images is increasing. In this regard, a range of display devices, such as liquid crystal display (LCD), plasma display panel (PDP), and organic light-emitting display have recently come into widespread use.

Such a display device has a touch-based user interface to detect a touch input to a display panel by a user and perform input processing based on the detected touch in order for more various functions.

Such a touch display device having a touch-based user interface may detect a user's touch input to a display panel using a plurality of touch electrodes disposed on the display panel (i.e. an on-cell touchscreen structure) or using a plurality of touch electrodes disposed in the display panel (i.e. an in-cell touchscreen structure).

For example, such a touch display device uses a touch driving circuit to apply a touch driving signal to touch electrodes through touch lines and detect changes in capacitance in response to a user's touch on the display panel. The touch display device may determine whether or not a touch is input (i.e. a touch event) to the display panel and determine a touch position on the display panel, on the basis of such changes in capacitance.

In addition, since such a display device provides a display function as well as a touch sensing function, gate lines for display driving, data lines through which a data voltage is applied, and the like are disposed on the display panel.

In this case, capacitance may be formed between display driving data lines and touch lines, thereby causing crosstalk in a touch sensing signal, which is problematic.

SUMMARY

Various aspects provide a touch display device and a display panel able to improve touch sensing performance by reducing crosstalk occurring between data lines and touch lines.

Also provided are a touch display device and a display panel having a structure able to reduce crosstalk occurring between data lines and touch lines.

According to an aspect, a touch display device including: a plurality of touch electrodes embedded in a display panel and spaced apart from each other; a plurality of touch lines connected to the plurality of touch electrodes to transfer a touch driving signal to the plurality of touch electrodes; a plurality of data lines overlapping the plurality of touch lines; and a shield pattern disposed between the touch lines and the data lines to overlap the plurality of data lines, wherein, a shield signal is applied to the shield pattern through a shield line in an area not overlapping the touch lines or the data lines.

According to an aspect, the shield line may be the touch electrodes.

According to an aspect, the shield line may be a backlight shield pattern provided on peripheral areas of pixels.

According to an aspect, the shield line may be conductive lines allowing the shield signal to be transferred therethrough.

According to an aspect, the shield line may be conductive lines connected to a backlight shield pattern provided on peripheral areas of pixels and allow the shield signal to be transferred therethrough.

According to an aspect, the shield signal may be a common voltage.

According to an aspect, the shield signal may be a signal different from a common voltage.

According to an aspect, the shield pattern may be located over a color filter.

According to an aspect, an insulation layer having a predetermined thickness may be provided between the touch electrodes and the touch lines.

According to an aspect, the insulation layer may be an organic film containing a photo acrylic material or an inorganic film containing silicon nitride.

According to an aspect, if the insulation layer has a greater thickness than the touch lines, the touch electrodes may be disposed coplanar with the pixel electrodes.

According to an aspect, if the insulation layer has a smaller thickness than the touch lines, the touch electrodes have a height different from the touch lines above the touch lines.

According to another aspect, a display panel may include: a plurality of touch electrodes spaced apart from each other; a plurality of touch lines connected to the plurality of touch electrodes to transfer a touch driving signal to the plurality of touch electrodes; a plurality of data lines overlapping the touch lines; and a shield pattern disposed between the plurality of touch lines and the plurality of data lines to overlap the plurality of data lines, wherein, a shield signal is applied to the shield pattern through a shield line in an area not overlapping the touch lines or the data lines.

According to embodiments, the touch display device and the display panel may improve touch sensing performance by reducing crosstalk occurring between data lines and touch lines.

According to embodiments, the touch display device and the display panel have a structure able to reduce crosstalk occurring between data lines and touch lines.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
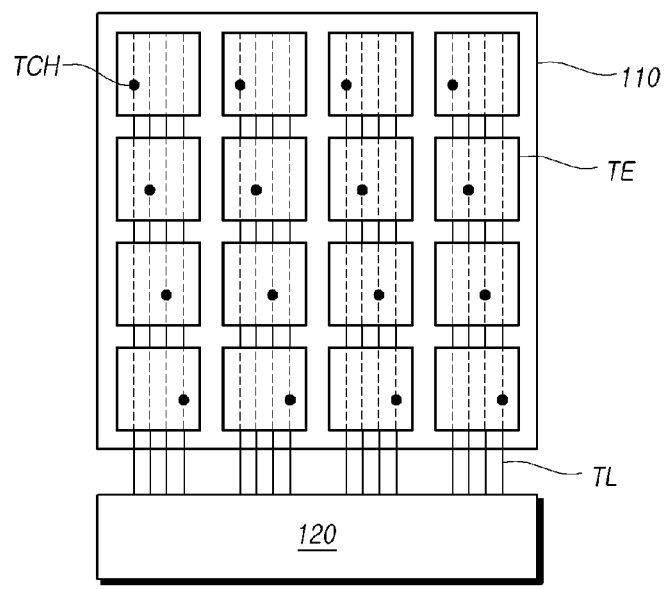
FIG. 1 illustrates a schematic configuration of a touch display device according to embodiments.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a schematic configuration of a touch display device 100 according to embodiments.

Referring to FIG. 1, the touch display device 100 according to embodiments may include a display panel 110 on which a plurality of touch electrodes TE and a plurality of touch lines TL are disposed and a touch driving circuit 120 for driving the touch electrodes TE and the touch lines TL.

The plurality of touch electrodes TE may be disposed on the display panel 110 or may be embedded in the display panel 110.

The plurality of touch electrodes TE may be disposed separately from each other, and may be connected to the plurality of touch lines TL, respectively. In this case, the touch electrodes TE may receive a touch driving signal from the touch driving circuit 120 through the touch lines TL and may transfer touch sensing signals through the touch lines TL.

Alternatively, the plurality of touch electrodes TE may be divided into touch driving electrodes to which the touch driving signal is applied and touch sensing electrodes transferring the touch sensing signals.

In addition, in a case in which the touch display device 100 is a liquid crystal display, the plurality of touch electrodes TE may be common electrodes to which a common voltage Vcom for display driving is applied during display driving periods.

That is, the plurality of touch electrodes TE may receive the common voltage Vcom during the display driving periods and receive the touch driving signal during touch driving periods.

The plurality of touch lines TL are disposed to overlap the touch electrodes TE, whereas each of the touch lines TL may be connected to the corresponding touch electrode TE through a touch contact hole TCH.

Alternatively, the plurality of touch lines TL may be disposed along the peripheral area of the display panel 110 to be connected to the plurality of touch electrodes TE, respectively.

In a case in which the plurality of touch electrodes TE include the touch driving electrodes and the touch sensing electrodes, the plurality of touch lines TL may be divided into touch driving lines connected to the touch driving electrodes and touch sensing lines connected to the touch sensing electrodes.

During the touch driving periods, the touch driving circuit 120 may output the touch driving signal to the touch electrodes TE through the touch lines TL and may determine a touch event (i.e. whether or not a touch is input by a user) and a touch position by receiving the touch sensing signals.

The touch driving circuit 120 may detect the touch on the basis of changes in capacitance formed by the user's touch on the display panel 110. For example, the touch driving circuit 120 may detect the touch by self-capacitance sensing or mutual-capacitance sensing.

In self-capacitance sensing, the touch driving circuit 120 may output the touch driving signal to the touch electrodes TE through the touch lines TL and receive the touch sensing signals from the touch electrodes TE through the touch lines TL to detect the user's touch during the touch driving periods.

In mutual-capacitance sensing, the touch driving circuit 120 may output the touch driving signal through the touch driving lines connected to the touch driving electrodes and detect the user's touch by receiving the touch sensing signals through the touch sensing lines connected to the touch sensing electrodes during the touch driving periods.

In addition, the touch driving circuit 120 may detect the user's touch using the two types of capacitance sensing by separately using self-capacitance sensing and the mutual-capacitance sensing in divided time segments, i.e. different time division.

Not only the touch sensing components but also display driving components may be disposed on the display panel 110 of the touch display device 100.

For example, a plurality of gate lines (not shown), through which a scan signal for controlling the timing of subpixels disposed in the display panel 110 are applied during the display driving periods, may be provided. In addition, a plurality of data lines DL, through which a data voltage is supplied to the subpixels, may be provided.

In addition, in a case in which the touch display device 100 is a liquid crystal display, pixel electrodes generating an electric field together with the common electrodes during the display driving periods may be provided.

Figure 2:
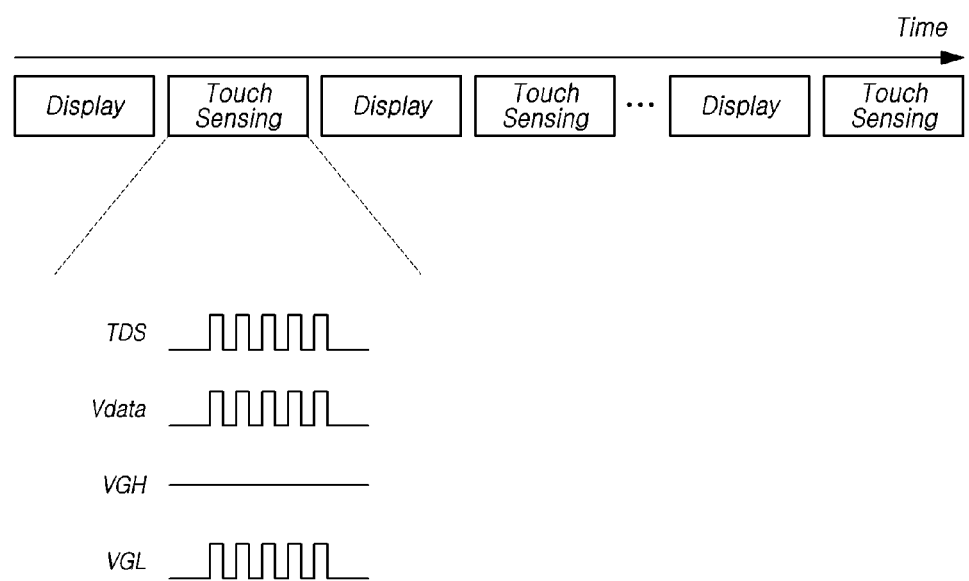
FIG. 2 is a signal timing diagram of display driving and touch sensing performed in the touch display device according to embodiments, in which the display driving and the touch sensing are performed in divided time segments, i.e. different time slots.

FIG. 2 is a signal timing diagram of the display driving and the touch sensing performed in the touch display device 100 according to embodiments, in which the display driving and the touch sensing are performed in divided time segments, i.e. different time slots.

Referring to FIG. 2, the touch display device 100 according to embodiments may perform the touch sensing by driving the touch electrodes TE of the display panel 110 in periods (e.g. blank periods) between the display periods.

For example, the touch display device 100 may perform the touch sensing during vertical blank periods respectively present in a single image frame or may perform the touch sensing during some horizontal periods among a plurality of horizontal periods present in the single image frame.

In a case in which the common electrodes of the display panel 110 are used as the touch electrodes TE, the common voltage Vcom may be applied to the touch electrodes TE in the display periods, and the touch driving signal TDS may be applied to the touch electrodes TE in touch sensing periods.

The touch driving signal TDS may be a pulse signal, the voltage magnitude of which changes over time.

Here, the electrodes, signal lines for the display driving, or the like may have no voltages applied thereto or may be in a constant-voltage, since the display driving is not performed during the touch sensing period. Accordingly, parasitic capacitance may be formed among the touch electrodes TE to which the touch driving signal TDS is applied, the gate lines, and the data lines DL, and the ability to detect the touch sensing signals TSS may be degraded by the parasitic capacitance.

To reduce the parasitic capacitance generated among the touch electrodes TE, the gate lines, and the data lines DL, a signal with same voltage and same phase as the touch driving signal TDS applied to the touch electrodes TE may be supplied to the gate lines, the data lines DL, and the like in the touch sensing periods.

In the touch sensing periods, a data voltage Vdata, the voltage and phase of which are the same as those of the touch driving signal TDS, may be supplied to the data lines DL during the touch sensing periods. Here, since a gate low voltage VGL is applied to the gate lines during the touch sensing periods, a signal (e.g. gate low voltage VGL) may be supplied to the gate lines so as to have the same voltage and phase as the touch driving signal TDS.

As described above, due to the supply of the alternating signal, the voltage and phase of which are the same as those of the touch driving signal TDS, to the gate lines, the data lines DL, and the like during the touch sensing periods, parasitic capacitance between the touch electrodes TE and the signal lines may be prevented, thereby improving the ability to detect the touch sensing signals TSS.

The touch display device 100 may simultaneously perform the display driving and the touch sensing.

Figure 3:
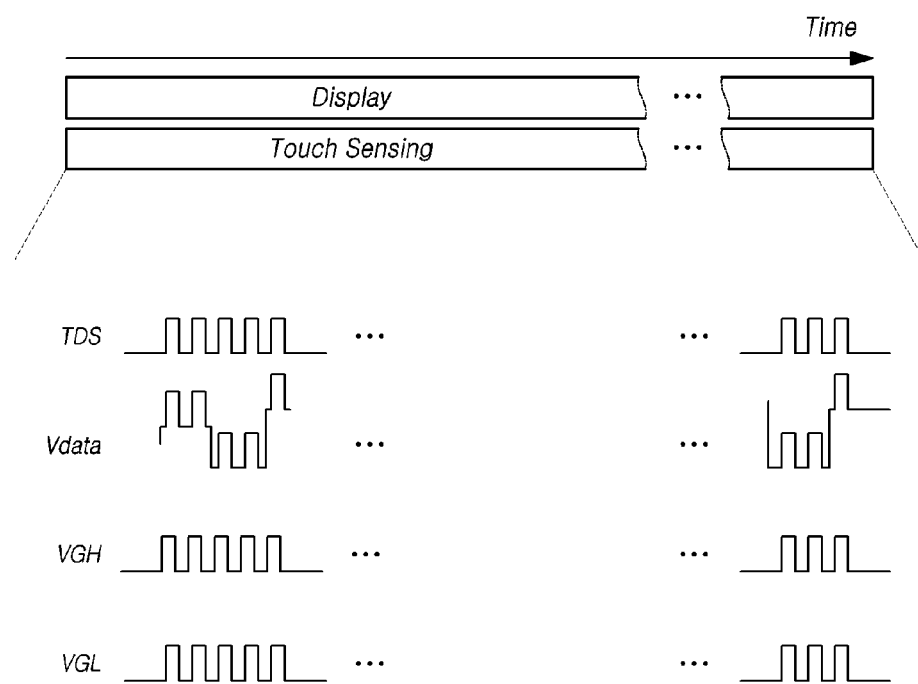
FIG. 3 is another timing diagram of the display driving and the touch sensing performed in the touch display device according to embodiments, in a case in which the display driving and the touch sensing are simultaneously performed.

FIG. 3 is another timing diagram of the display driving and the touch sensing performed in the touch display device according to embodiments, in a case in which the display driving period and the touch sensing period are simultaneously performed.

Referring to FIG. 3, the touch display device 100 according to embodiments may simultaneously perform the display driving period and the touch sensing period.

Here, the touch sensing period may be the same as the display driving period or may be a blank period between the display driving periods. That is, the touch sensing period may be independently performed, irrespective of the display driving period, so that the touch sensing period and the display driving period may be simultaneously performed.

In a case in which the touch sensing period is performed simultaneously with the display driving period, the touch driving signal TDS may be applied to the touch electrodes TE, the data voltage Vdata may be supplied to the data lines DL for the display driving period, and a gate high voltage VGH, a gate low voltage VGL, and the like may be supplied to be used for the output of the scan signal applied to the gate lines.

Here, in a case in which the common electrodes of the display panel 110 are used as the touch electrodes TE, a voltage difference corresponding to image data may not be generated between the common electrodes and the pixel electrodes to which the data voltage Vdata is applied, since the touch driving signal TDS is applied to the touch electrodes TE.

That is, since the voltage of the touch driving signal TDS changes over time, a voltage difference corresponding to the image data may not be formed between the common electrodes to which the touch driving signal TDS is applied and the pixel electrodes, and thus, the subpixels SP may not express brightness corresponding to the image data.

Accordingly, the data voltage Vdata, modulated on the basis of the touch driving signal TDS, may be supplied to the data lines DL, whereby the voltage difference corresponding to the image data is formed between the common electrodes to which the touch driving signal TDS is applied and the pixel electrodes.

Such modulation of the data voltage Vdata may be performed by modulating, for example, a gamma voltage used for generating the data voltage Vdata in the data driving circuit. Alternatively, the modulated data voltage Vdata may be supplied to the data lines DL by modulating the ground voltage disposed in the touch panel 110.

In addition, the gate high voltage VGH and the gate low voltage VGL, used for generating the scan signal supplied to the gate lines, may be modulated on the basis of the touch driving signal TDS to apply the modulated scan signal to the gate lines, so that the gate lines are driven ordinarily.

As described above, the gate high voltage VGH and the gate low voltage VGL, used for generating the data voltage Vdata applied to the data lines DL and the scan signal supplied to the gate lines, may be modulated on the basis of the touch driving signal TDS, so that the display driving and the touch sensing may be simultaneously performed.

In this case, capacitance may be formed between the touch lines TL, to which the touch driving signal TDS is applied during the touch sensing periods, and the data lines DL, to which the data voltage Vdata is applied during the display driving periods. Such capacitance may act as crosstalk in the touch sensing signals.

Embodiments of the present disclosure provide the touch display device 100 and a driving method thereof able to reduce capacitance between the touch lines TL and the data lines DL overlapping the touch lines TL in the display panel 110, thereby reducing crosstalk.

Figure 4:
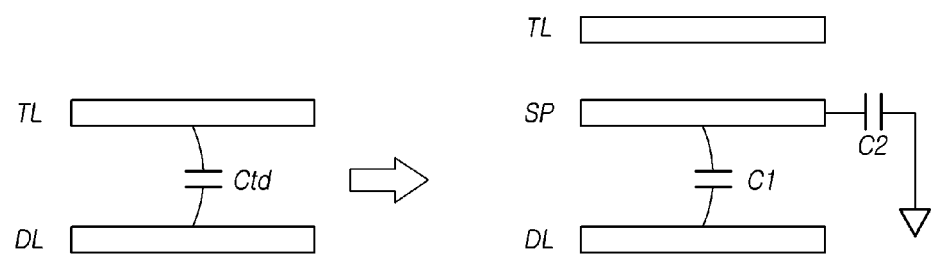
FIG. 4 is a conceptual view illustrating a structure reducing capacitance between the touch lines and the data lines overlapping the touch lines in the touch display device according to embodiments.

FIG. 4 is a conceptual view illustrating a structure reducing capacitance between the touch lines TL and the data lines DL overlapping the touch lines TL in the touch display device 100 according to embodiments.

Referring to FIG. 4, in the touch display device 100 according to embodiments, a touch line TL may be disposed on the display panel 110, and a data line DL may be disposed to overlap the touch line TL.

Capacitance Ctd formed between the touch line TL and the data line DL may act as crosstalk in a touch sensing signal.

The touch display device 100 according to embodiments has a shield pattern SP disposed between the touch line TL and the data line DL to reduce the capacitance Ctd that may be formed between the touch line TL and the data line DL.

The shield pattern SP is disposed at an area in which the touch line TL overlaps the data line DL. The shield pattern SP may be disposed to overlap all or some of the data line DL. That is, the shield pattern SP may entirely overlap the data line DL or may be configured such that the area of the shield pattern SP overlapping the data line DL is properly adjusted as required.

As a result, the shield pattern SP may prevent the capacitance Ctd from being directly formed between the touch line TL and the data line DL.

Here, the shield pattern SP disposed between the touch line TL and the data line DL may have a shield signal applied thereto through a shield line.

For example, in a case in which the shield pattern SP is connected to the touch electrode TE as the shield line, the common voltage Vcom applied to the touch electrode TE during the display driving periods may also be applied to the shield pattern SP.

In this case, capacitance C1 may be formed between the shield pattern SP and the data line DL during the display driving periods, but the magnitude of the capacitance C1 may be relatively reduced. The value of capacitance C2 formed between the shield pattern SP and the touch electrode TE may be greater than that of the capacitance C1 formed between the shield pattern SP and the data line DL.

Since the capacitance C2 formed by the touch electrode TE is significantly larger than the capacitance C1 formed by the data line DL, the capacitance C1 formed by the data line DL has substantially no effect on the capacitance C2 formed by the touch electrode TE.

As a result, the capacitance C1 formed by the data line DL has no direct effect on the touch line TL or no indirect effect on the touch line TL through the touch electrode TE. Accordingly, the capacitance C1 formed by the data line DL may be prevented from acting as crosstalk in the touch sensing signal.

The shield line connected to the shield pattern SP may be not only the touch electrode TE, but also a backlight shield pattern BLSP provided on a peripheral area of the pixel, a gate electrode of a thin-film transistor (TFT) of the display panel 110, or an independent shield electrode provided in any space of the display panel 110.

As described above, the application of the shield signal to the shield pattern SP through the shield line may reduce the capacitance between the shield pattern SP and the shield lines connected thereto or reduce the effect of the data voltage transferred through the data line DL.

Figure 5:
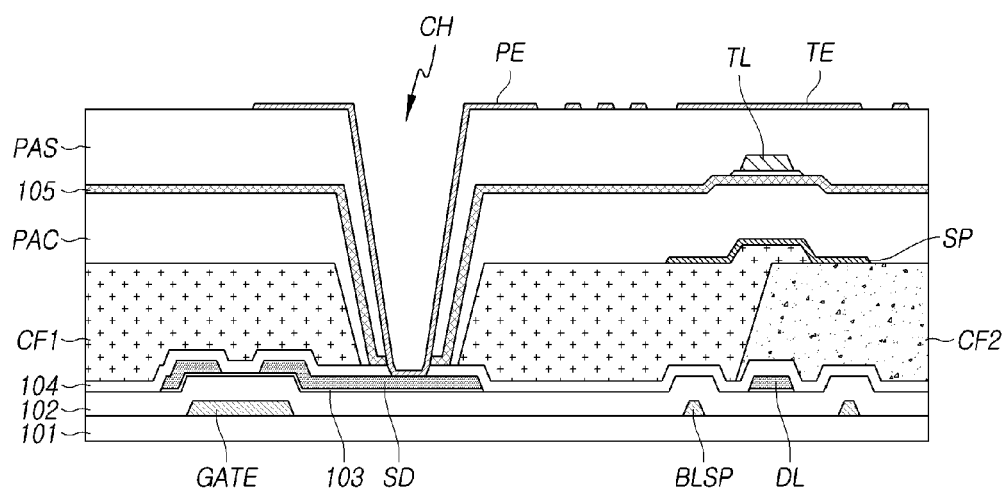
FIG. 5 is a cross-sectional view illustrating a structure including a shield pattern in the touch display device according to embodiments.

FIG. 5 is a cross-sectional view illustrating a structure including a shield pattern in the touch display device according to embodiments.

Referring to FIG. 5 in the touch display device 100 according to embodiments, a gate electrode GATE and a backlight shield pattern BLSP are provided on a substrate 101.

The backlight shield pattern BLSP may reduce degradations in display quality that would otherwise be caused by the distortion of a liquid crystal layer corresponding to a viewing angle controlling pixel due to the data voltage Vdata transferred through data line DL, and may be provided on the same layer, while being made of the same material, as gate line (not shown) and the gate electrode GATE.

A gate insulation layer 102 covers the gate electrode GATE, and the backlight shield pattern BLSP. An active layer 103, a source or drain electrode SD, and the data line DL are disposed over the gate insulation layer 102.

A passivation layer 104 is disposed over the source or drain electrode SD and the data line DL. Color filters CF1 and CF2 for displaying colors are disposed over the passivation layer 104. The color filters CF1 and CF2 may be color filters of three colors, i.e. red (R), green (G), blue (B), or color filters of four colors, i.e. red (R), green (G), and blue (B), and white (W). Here, the color filters CF1 and CF2 may be positioned over the passivation layer 104 or over a pixel electrode, depending on the type of the touch display device 100.

In a case in which the color filters CF1 and CF2 are positioned over the passivation layer 104, the shield pattern SP may be disposed in a portion of the upper area of the color filters CF1 and CF2 overlapping the data line DL. Here, the shield pattern SP may be disposed to overlap the entire area of the data line DL although the shield pattern SP may be disposed to overlap a portion of the area of the data line DL in one embodiment.

A planarization layer PAC is disposed over the shield pattern SP and the color filters CF1 and CF2.

A buffer layer 105 is provided over the planarization layer PAC. Touch line TL are disposed over the buffer layer 105.

The passivation layer 104, the planarization layer PAC, and the buffer layer 105 may be made of an insulating material.

An insulation layer PAS may be provided over the touch line TL to insulate the touch line TL from a pixel electrode PE or a touch electrode TE. The insulation layer PAS may be made of an organic film, such as a photo acrylic material, or an inorganic film of, for example, silicon nitride (SiNx).

The pixel electrode PE and the touch electrode TE may be provided over the insulation layer PAS. The pixel electrode PE may be connected to the source/drain electrode SD via a contact hole CH.

The pixel electrode PE and the touch electrode TE may be disposed on different layers or the same layer. Here, the pixel electrode PE and the touch electrode TE are illustrated as being disposed on the same layer. The touch electrode TE may be a common electrode to which the common voltage Vcom is applied during display driving periods.

Here, the shield pattern SP disposed in an area in which the touch line TL and the data line DL overlap may be insulated from the touch line TL via the planarization layer PAC made of an insulating material and from the touch electrode TE via the insulation layer PAS.

As a result, the shield pattern SP disposed between the touch line TL and data line DL may prevent capacitance Ctd from being formed between the touch line TL and data line DL.

These features may reduce crosstalk in a touch sensing signal, while improving the performance of touch sensing, in the structure in which the touch line TL and data line DL overlap.

The thickness of the insulation layer PAS provided over the touch line TL may be variously adjusted.

For example, in a case in which the insulation layer PAS is provided higher than the touch line TL, the pixel electrode PE and the touch electrode TE may be disposed coplanar, over the insulation layer PAS, which is flat.

Figure 6:
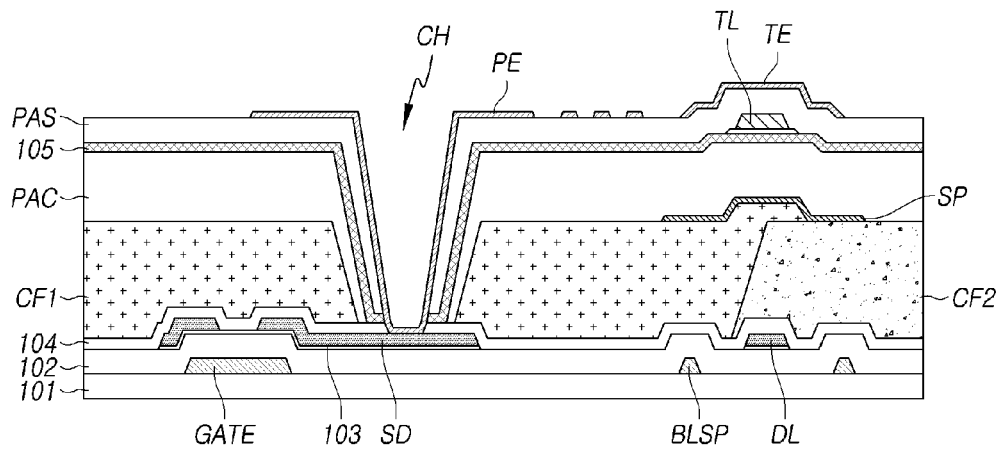
FIG. 6 is a cross-sectional view illustrating a structure including a shield pattern in the touch display device according to other embodiments.

In contrast, in a case in which the insulation layer PAS is provided lower than the touch line TL, as illustrated in FIG. 6, the touch electrode TE disposed over the touch line TL may protrude along the shape of the touch line TL. In this case, the pixel electrode PE and the touch electrode TE may have a predetermined height difference, instead of being disposed coplanar.

Accordingly, in the touch display device 100 according to embodiments, the shield pattern SP provided in a position overlapping to the touch line TL and data line DL may prevent or at least reduce the capacitance Ctd that would otherwise be directly formed between the touch line TL and data line DL. In addition, since the touch line TL and data line DL are disposed to overlap each other, the area allowing light emitted by the pixel electrode PE to exit may be increased, thereby improving the aperture ratio.

In addition, in the touch display device 100 according to embodiments, a shield signal may be applied through a shield line electrically connected to the shield pattern SP to prevent capacitance from being formed between the shield pattern SP and the data line DL.

Figure 7:
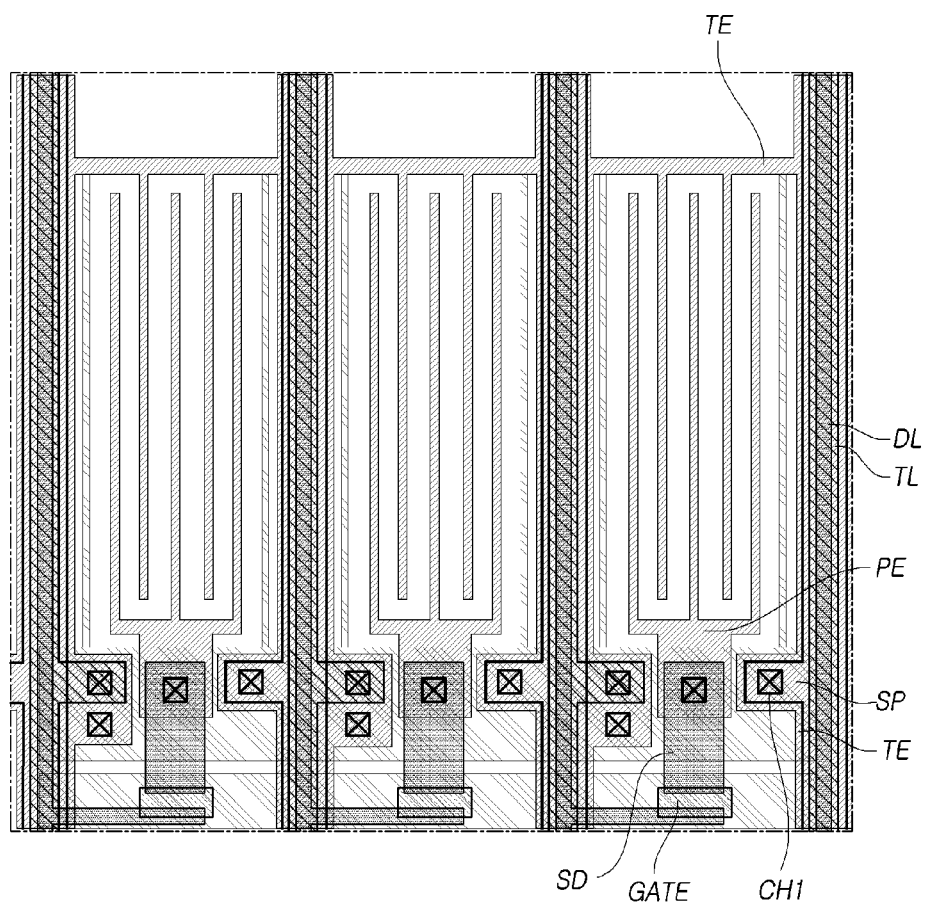
FIG. 7 is a view illustrating an example structure of applying a shield signal to the shield pattern in the touch display device according to embodiments, in which a common voltage is applied to the shield pattern.

FIG. 7 is a view illustrating an example structure of applying a shield signal to the shield pattern in the touch display device according to embodiments, in which a common voltage is applied to the shield pattern.

Referring to FIG. 7, in the touch display device 100 according to embodiments, the shield pattern SP is disposed between the touch lines TL and the data lines DL while overlapping the data lines DL. In an area in which the shield pattern SP does not overlap the touch lines TL or the data lines DL, the shield pattern SP may be electrically connected to the touch electrodes TE via the contact holes CH1.

This is because, in a case in which the shield pattern SP is in contact with the touch electrodes TE in the area in which the shield pattern SP does not overlap the touch lines TL or the data lines DL, the effect on the touch electrodes TE by parasitic capacitance formed between the shield pattern SP and the touch electrodes TE or the data lines DL may be relatively reduced.

Due to the shield pattern SP being in electrical contact with the touch electrodes TE to which the touch driving signal TDS is applied during the touch sensing periods as described above, the shield pattern SP forms relatively large capacitance together with the touch electrodes TE to which the touch driving signal TDS is applied during the touch sensing periods. Accordingly, even in the case in which the parasitic capacitance is formed between touch electrodes TE or the data lines DL, the parasitic capacitance between touch electrodes TE or the data lines DL may not have an effect on the relatively large capacitance formed between the shield pattern SP and the touch electrodes TE.

As a result, the parasitic capacitance formed between the shield pattern SP and the data lines DL may have no indirect effect on the touch electrodes TE or the touch lines TL, and thus, crosstalk may be prevented from occurring in the touch sensing signals.

In particular, since the shield pattern SP is in electrical contact with the touch electrodes TE, the common voltage Vcom applied to the touch electrodes TE during the display driving periods is also applied to the shield pattern SP. That is, in a case in which the shield pattern SP is in electrical contact with the touch electrodes TE, the common voltage Vcom serves as a shield signal applied to the shield pattern SP.

As a result, the capacitance formed by the shield pattern SP and the touch electrodes TE may have a significantly larger value than the capacitance formed by the shield pattern SP and the data lines DL, thereby reducing the effect of the capacitance formed by the data lines DL on the touch electrodes TE.

In addition, the shield pattern SP may be in contact with the backlight shield pattern BLSP provided on the peripheral areas of the pixels, the gate electrodes GATE of thin-film transistors (TFTs) of the display panel 110, or an independent shield electrode provided in any space of the display panel 110.

Figure 8:
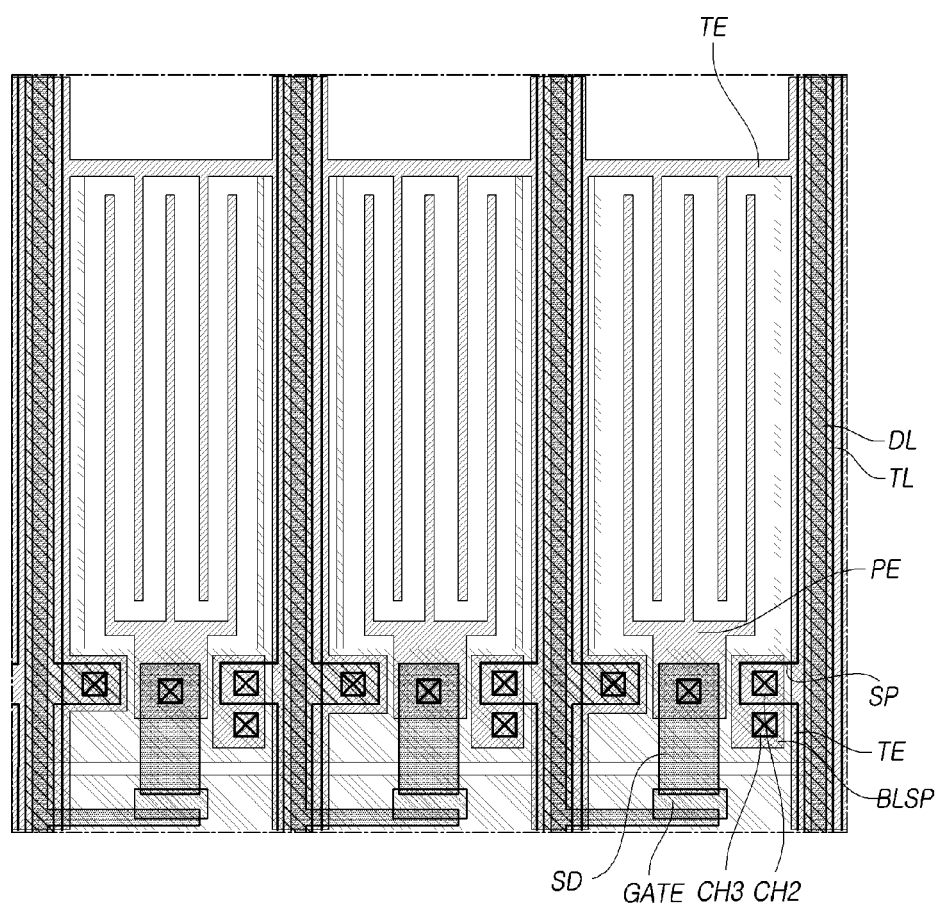
FIG. 8 is a view illustrating another example structure of applying a shield signal to the shield pattern in the touch display device according to embodiments, in which the shield signal is applied to the shield pattern in contact with the backlight shield pattern.

FIG. 8 is a view illustrating another example structure of applying a shield signal to the shield pattern in the touch display device according to embodiments, in which the shield signal is applied to the shield pattern in contact with the backlight shield pattern.

Referring to FIG. 8, in the touch display device 100 according to embodiments, the shield pattern SP is disposed between the touch lines TL and the data lines DL while overlapping the data lines DL. In an area in which the shield pattern SP does not overlap the touch lines TL or the data lines DL, the shield pattern SP may be electrically connected to the touch electrodes TE via contact holes CH2 and CH3.

The shield pattern SP being in electrical contact with the backlight shield pattern BLSP in the area in which the shield pattern SP does not overlap the touch lines TL or the data lines DL is intended to reduce the effect of parasitic capacitance formed between the shield pattern SP and the touch electrodes TE or the data lines DL.

In a case in which the shield pattern SP is in electrical contact with the backlight shield pattern BLSP, an independent shield signal may be applied to the shield pattern SP through the backlight shield pattern BLSP.

Here, the shield signal applied to the shield pattern SP may be a signal, the voltage and phase of which are the same as those of the touch driving signal TDS applied to the touch electrodes TE during the touch sensing periods, or a signal, the voltage and phase of which are the same as those of the common voltage Vcom applied to the pixel electrode PE during the display driving periods. Alternatively, the shield signal may be a signal, the voltage and phase of which are different from those of either the touch driving signal TDS or the common voltage Vcom.

As described above, the shield pattern SP forms relatively large capacitance, since the shield pattern SP is in contact with the backlight shield pattern BLSP through which the shield signal is applied thereto. Thus, even in the case in which the parasitic capacitance is formed between the shield pattern SP and the data lines DL, the parasitic capacitance has no effect on the relatively larger capacitance formed between the shield pattern SP and the backlight shield pattern BLSP.

Accordingly, the parasitic capacitance formed between shield pattern SP and the data lines DL has no indirect effect on the touch electrodes TE or touch lines TL, and thus, crosstalk occurring in the touch sensing signals may be reduced.

In addition, in a case in which the shield pattern SP is in electrical contact with the backlight shield pattern BLSP, a load caused by the application of the shield signal may be reduced, compared to the case in which the common voltage Vcom is applied to the shield pattern SP through the touch electrodes TE.

Figure 9:
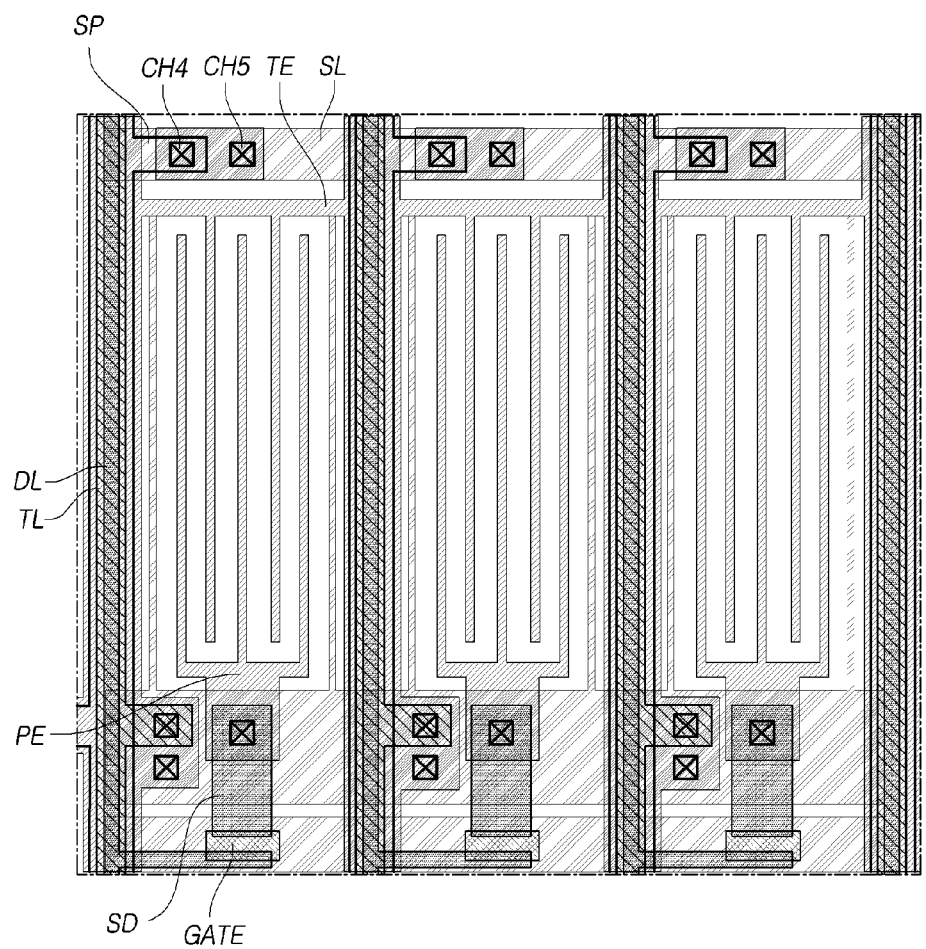
FIG. 9 is a view illustrating another example structure of applying a shield signal to the shield pattern in the touch display device according to embodiments, in which the shield signal is applied to the shield pattern through independent shield lines.

FIG. 9 is a view illustrating another example structure of applying a shield signal to the shield pattern in the touch display device according to embodiments, in which the shield signal is applied to the shield pattern through independent shield lines.

Referring to FIG. 9, in the touch display device 100 according to embodiments, the shield pattern SP is disposed between the touch lines TL and the data lines DL while overlapping the data lines DL. In an area in which the shield pattern SP does not overlap the touch lines TL or the data lines DL, the shield pattern SP may be connected to independent shield lines SL through contact holes CH4 and CH5, and the shield signal may be applied to the shield pattern SP through the shield lines SL.

The shield lines SL are conductive lines through which the same shield signal is applied to the shield pattern SP. The shield lines SL may be connected to the shield pattern SP through the peripheral areas of the pixels in which no touch electrodes TE are provided. Here, the shield lines SL are illustrated as being connected to the shield pattern SP through the area in which no touch electrodes TE are provided, in positions above the pixels.

Accordingly, the shield lines SL may be disposed on the same layer, while being made of the same material, as the shield pattern SP. For example, the shield lines SL may be disposed on the same layer, while being made of the same material, as the gate lines (not shown) and the gate electrodes GATE.

The application of the shield signal to the shield pattern SP through the shield lines SL in the area in which the shield pattern SP does not overlap the touch lines TL or the data lines DL is intended to reduce the effect of parasitic capacitance formed between the shield pattern SP and the touch electrodes TE or the data lines DL.

In this case, since the shield pattern SP is connected to the shield lines SL, the shield signal may be applied to the shield pattern SP through the shield lines SL.

Here, the shield signal applied to the shield pattern SP may be a signal, the voltage and phase of which are the same as those of the touch driving signal TDS applied to the touch electrodes TE during the touch sensing periods, or a signal, the voltage and phase of which are the same as those of the common voltage Vcom applied to the pixel electrode PE during the display driving periods. Alternatively, the shield signal may be a signal, the voltage and phase of which are different from those of either the touch driving signal TDS or the common voltage Vcom.

Since the shield pattern SP has the shield signal applied thereto through the shield lines SL as described above, even in the case in which parasitic capacitance is formed between the shield pattern SP and the data lines DL, the effect of the parasitic capacitance formed between the shield pattern SP and the data lines DL may be reduced by relatively larger capacitance formed in the shield pattern SP through the shield lines SL.

Accordingly, the parasitic capacitance formed between shield pattern SP and the data lines DL has no indirect effect on the touch electrodes TE or touch lines TL, and thus, crosstalk occurring in the touch sensing signals may be reduced.

In this case, a load caused by the application of the shield signal may also be reduced, compared to the case in which the common voltage Vcom is applied to the shield pattern SP through the touch electrodes TE, since the shield signal is applied to the shield pattern SP through the shield lines SL.

Figure 10:
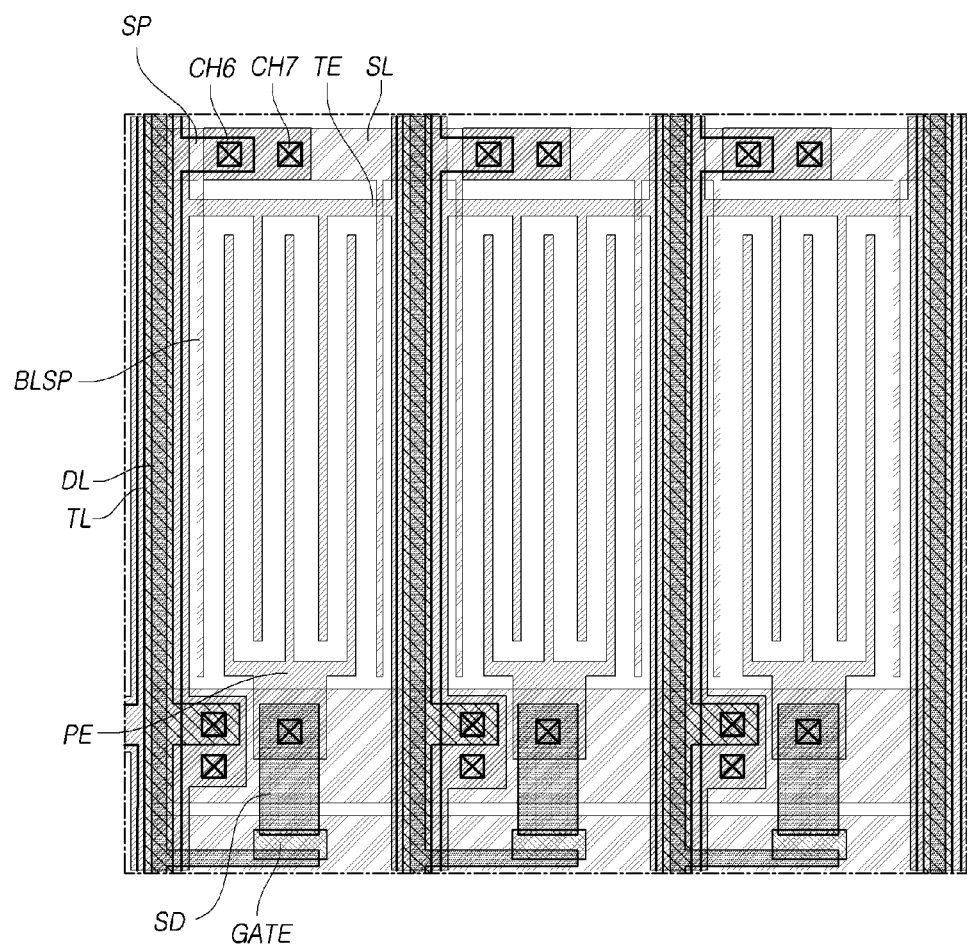
FIG. 10 is a view illustrating another example structure of applying a shield signal to the shield pattern in the touch display device according to embodiments, in which the shield pattern and the backlight shield pattern are connected through separate shield lines and the shield signal is applied to the shield pattern through independent shield lines.

FIG. 10 is a view illustrating another example structure of applying a shield signal to the shield pattern in the touch display device according to embodiments, in which the shield pattern and the backlight shield pattern are connected through independent shield lines and the shield signal is applied to the shield pattern through independent shield lines.

Referring to FIG. 10, in the touch display device 100 according to embodiments, the shield pattern SP is disposed between the touch lines TL and the data lines DL while overlapping the data lines DL. In an area in which the shield pattern SP does not overlap the touch lines TL or the data lines DL, the shield pattern SP and the backlight shield pattern BLSP may be connected through independent shield lines SL and the shield signal may be applied to the shield pattern SP through the shield lines SL.

The shield lines SL are conductive lines through which the same shield signal is applied to the shield pattern SP. The shield lines SL may be connected to the shield pattern SP through the peripheral areas of the pixels in which no touch electrodes TE are provided. Here, the shield lines SL are illustrated as being connected to the shield pattern SP and the backlight shield pattern BLSP through the area in which no touch electrodes TE are provided.

Accordingly, the shield lines SL may be disposed on the same layer, while being made of the same material, as the shield pattern SP and the backlight shield pattern BLSP. In this case, all of the shield pattern SP, the shield lines SL, and the backlight shield pattern BLSP may be disposed on the same layer, while being made of the same material, as the gate lines (not shown) and the gate electrodes GATE.

As described above, the shield pattern SP is in contact with the backlight shield pattern BLSP in the area in which the shield pattern SP does not overlap the touch lines TL or the data lines DL, and the shield signal is applied to the shield pattern SP through the shield lines SL. These features are intended to reduce the effect of parasitic capacitance formed between the shield pattern SP and the touch electrodes TE or the data lines DL.

In this case, since the shield pattern SP is connected to the backlight shield pattern BLSP through the shield lines SL, the shield signal may be applied to the shield pattern SP and the backlight shield pattern BLSP through the shield lines SL.

Here, the shield signal applied to the shield pattern SP and the backlight shield pattern BLSP may be a signal, the voltage and phase of which are the same as those of the touch driving signal TDS applied to the touch electrodes TE during the touch sensing periods, or a signal, the voltage and phase of which are the same as those of the common voltage Vcom applied to the pixel electrode PE during the display driving periods. Alternatively, the shield signal may be a signal, the voltage and phase of which are different from those of either the touch driving signal TDS or the common voltage Vcom.

Since the shield pattern SP has the shield signal applied thereto through the shield lines SL as described above, even in the case in which parasitic capacitance is formed between the shield pattern SP and the data lines DL, the effect of the parasitic capacitance formed between the shield pattern SP and the data lines DL may be reduced by relatively larger capacitance formed in the shield pattern SP through the shield lines SL.

Accordingly, the parasitic capacitance formed between shield pattern SP and the data lines DL has no indirect effect on the touch electrodes TE or touch lines TL, and thus, crosstalk occurring in the touch sensing signals may be reduced.

In this case, a load caused by the application of the shield signal may also be reduced, compared to the case in which the common voltage Vcom is applied to the shield pattern SP through the touch electrodes TE, since the shield signal and the shield pattern SP are in electrical contact with each other.

According to the foregoing embodiments, the shield pattern SP is disposed in the area in which the touch lines TL overlap the data lines DL, and the shield signal is applied through the shield lines SL in the area in which the shield pattern SP does not overlap the touch lines TL or the data lines DL, such that direct capacitance is not formed between the touch lines TL and the data lines DL.

In addition, since the shield signal is applied to the shield pattern SP through the shield lines SL, capacitance formed between the shield pattern SP and the data lines DL may not have an effect on the touch sensing signals transferred through the touch lines TL.

Accordingly, even in the case in which the touch lines TL overlap the data lines DL, capacitance formed by the data lines DL may be prevented or at least reduced from acting as crosstalk in the touch sensing signals. The performance of touch sensing may be improved, and the aperture ratio may be increased.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
   a plurality of touch electrodes embedded in a display panel and spaced apart from each other;
   a plurality of touch lines connected to the plurality of touch electrodes to transfer a touch driving signal to the plurality of touch electrodes;
   a plurality of data lines overlapping the plurality of touch lines; and
   a shield pattern disposed between the plurality of touch lines and the plurality of data lines to overlap the plurality of data lines, wherein a shield signal is applied to the shield pattern through at least one shield line in an area not overlapping the plurality of touch lines or the plurality of data lines,
   wherein the at least one shield line is a backlight shield pattern disposed on a peripheral area of a pixel included in the touch display device.

2. The touch display device according to claim 1, wherein the at least one shield line is a conductive line allowing the shield signal to be transferred therethrough.

3. The touch display device according to claim 1, wherein the shield signal is a signal different from a common voltage.

4. The touch display device according to claim 1, wherein the shield pattern is located over a color filter included in the touch display device.

5. The touch display device according to claim 1, wherein an insulation layer having a predetermined thickness is provided between the plurality of touch electrodes and the plurality of touch lines.

6. The touch display device according to claim 5, wherein the insulation layer is an organic film comprising a photo acrylic material or an inorganic film comprising silicon nitride.

7. The touch display device according to claim 5, further comprising:
   a plurality of pixel electrodes provided over the insulation layer.

8. The touch display device according to claim 7, wherein, if the insulation layer is higher than the plurality of touch lines, the plurality of touch electrodes are disposed coplanar with the plurality of pixel electrodes.

9. The touch display device according to claim 5, wherein, if the insulation layer is lower than the plurality of touch lines, the plurality of touch electrodes above the plurality of touch lines have heights different from the plurality of touch lines.

10. A display panel comprising:
    a plurality of touch electrodes spaced apart from each other;
    a plurality of touch lines connected to the plurality of touch electrodes to transfer a touch driving signal to the plurality of touch electrodes;
    a plurality of data lines overlapping the plurality of touch lines; and
    a shield pattern disposed between the plurality of touch lines and the plurality of data lines to overlap the plurality of data lines, wherein, a shield signal is applied to the shield pattern through at least one shield line in an area not overlapping the plurality of touch lines or the plurality of data lines, wherein the at least one shield line is a backlight shield pattern disposed on a peripheral area of a pixel included in the touch display device.

11. The display panel according to claim 10, wherein the at least one shield line is a conductive line allowing the shield signal to be transferred therethrough.

12. The display panel according to claim 10, wherein the shield pattern is located over a color filter.

13. The display panel according to claim 10, wherein an insulation layer having a predetermined thickness is provided between the plurality of touch electrodes and the plurality of touch lines.

14. The display panel according to claim 13, wherein the insulation layer is an organic film comprising a photo acrylic material or an inorganic film comprising silicon nitride.

15. The display panel according to claim 13, further comprising a plurality of pixel electrodes provided over the insulation layer.

16. The display panel according to claim 15, wherein, if the insulation layer is higher than the plurality of touch lines, the plurality of touch electrodes are disposed coplanar with the plurality of pixel electrodes.

17. The display panel according to claim 13, wherein, if the insulation layer is lower than the plurality of touch lines, the plurality of touch electrodes above the plurality of touch lines have heights different from the plurality of touch lines.

* * * * *